US008744755B2

(12) United States Patent
Takeuchi

(10) Patent No.: US 8,744,755 B2
(45) Date of Patent: Jun. 3, 2014

(54) NAVIGATION DEVICE, NAVIGATION METHOD AND PROGRAM

(75) Inventor: Akira Takeuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 511 days.

(21) Appl. No.: 12/973,142

(22) Filed: Dec. 20, 2010

(65) Prior Publication Data

US 2011/0166775 A1 Jul. 7, 2011

(30) Foreign Application Priority Data

Jan. 5, 2010 (JP) ................................ 2010-000605

(51) Int. Cl.
G01C 21/00 (2006.01)
G01C 21/26 (2006.01)

(52) U.S. Cl.
USPC ............................ 701/417; 701/457; 701/467

(58) Field of Classification Search
USPC ......... 701/411, 412, 417, 425, 426, 432, 438, 701/454, 457, 467
See application file for complete search history.

(56) References Cited

U.S. PATENT DOCUMENTS

| | | | | |
|---|---|---|---|---|
| 2002/0183922 A1* | 12/2002 | Tomasi et al. | ................. | 701/202 |
| 2004/0204837 A1* | 10/2004 | Singleton | ...................... | 701/209 |
| 2004/0210388 A1* | 10/2004 | Sugiura | .......................... | 701/209 |
| 2005/0049780 A1* | 3/2005 | Friedrichs et al. | ............. | 701/201 |
| 2005/0149253 A1* | 7/2005 | Nambata | ........................ | 701/201 |
| 2007/0203643 A1* | 8/2007 | Ramaswamy et al. | ........ | 701/211 |
| 2010/0305849 A1* | 12/2010 | Nirhamo | ....................... | 701/206 |
| 2010/0332116 A1* | 12/2010 | Sakashita | ...................... | 701/201 |
| 2011/0130960 A1* | 6/2011 | Sheha et al. | .................. | 701/201 |
| 2011/0196601 A1* | 8/2011 | Miura et al. | .................. | 701/200 |

FOREIGN PATENT DOCUMENTS

| | | |
|---|---|---|
| JP | 2001-147135 | 5/2001 |
| JP | 2007-225352 | 9/2007 |

* cited by examiner

Primary Examiner — Jason Holloway
(74) Attorney, Agent, or Firm — Oblon, Spivak, McClelland, Maier & Neustadt, L.L.P.

(57) ABSTRACT

There is provided a navigation device including a position information acquisition section which acquires a current position, a final destination setting section which sets a final destination, a stop-off genre setting section which sets a genre of a facility to be stopped at, a stop-off point selection section which selects a stop-off point based on a route to the final destination, and a route guidance section which performs notification of a route to the stop-off point at a branch point between the route to the final destination and the route to the stop-off point, shows a route to the stop-off point when entering the route to the stop-off point from the branch point, and switches a guidance destination to the final destination when arriving at the stop-off point.

20 Claims, 10 Drawing Sheets

NAVIGATION DEVICE, NAVIGATION METHOD AND PROGRAM

BACKGROUND OF THE INVENTION

1. Field of the Invention

The present invention relates to a navigation device, a navigation method, and a program, and particularly to a navigation device, a navigation method, and a program which are capable of, while showing a route to a final destination, performing notification of a route to a desired stop-off point.

2. Description of the Related Art

Currently, for example, a navigation device is in widespread use, which acquires a current position of a user by a GPS (Global Positioning System), displays the current position of the user and a route to a destination on a map, and shows the map to the user.

Such a navigation device is mainly used for indicating a route to a final destination to the user. However, the user may not necessarily want to follow the shortest route to the final destination. For example, the user may want to stop at a gas station or the like in the middle of the route to the final destination. At that time, it can be considered that the user desires to stop at any one of multiple gas stations that can be candidates.

Consequently, as described in JP-A-2007-225352, for example, there is a navigation device which prompts the user to set a new destination when deviated from the route to the destination. According to the navigation device, when deviated from the route to the destination, the navigation device determines that the destination is changed, and can set a new destination. At that time, when the user sets a stop-off point as the new destination, a route to the stop-off point can be obtained.

Further, as described in JP-A-2001-147135, for example, there is a navigation device which specifies a destination by a genre, and, depending on change of a current position, is capable of automatically setting a destination from among the facilities of a specified genre. According to the navigation device, a route to the nearest facility can be displayed by specifying a genre of the destination. At that time, when the user sets a genre of a stop-off point as the destination, a route to the nearest stop-off point can be obtained.

SUMMARY OF THE INVENTION

However, in both inventions described in JP-A-2007-225352 and JP-A-2001-147135, it was necessary that in the case where the user heads for a stop-off point, the user once sets the destination to the stop-off point, and when arriving at the stop-off point, the user sets again the destination to the final destination. For this reason, there was an issue that the operation was troublesome. The user potentially hopes to obtain desired information with as few operations as possible. For example, when travelling on a vehicle, a bicycle, or a motorcycle, it is dangerous to perform complicated operations, and it is necessary to stop for a moment to perform the operations. Further, a route to the stop-off point was selected without taking into consideration the route to the final destination, and hence, there was an issue that there was a possibility of a roundabout route being selected when heading for the final destination.

In light of the foregoing, it is desirable to provide a navigation device, a navigation method, and a program which are novel and improved, and which are capable of showing a route either to a final destination or to a stop-off point automatically depending on the situation the user is in.

According to an embodiment of the present invention, there is provided a navigation device which includes a position information acquisition section which acquires position information of a current position, a final destination setting section which sets a final destination, a stop-off genre setting section which sets a genre of a facility to be stopped at before arriving at the final destination, a stop-off point selection section which selects a stop-off point from among facilities included in the genre set by the stop-off genre setting section based on a route from the current position to the final destination, a route search section which searches for the route from the current position to the final destination and a route from the current position to the stop-off point, and a route guidance section which performs notification of the route to the stop-off point at a branch point between the route to the final destination and the route to the stop-off point while showing the route to the final destination, when detecting that the position information of the current position acquired by the position information acquisition section enters the route to the stop-off point from the branch point, switches a guidance destination to the stop-off point and shows the route to the stop-off point, and when detecting arrival at the stop-off point based on the position information acquired by the position information acquisition section, switches the guidance destination to the final destination.

According to such a configuration, the navigation device notifies the user of the position of the stop-off point while showing a route to the final destination. In particular, in the case where the route to the stop-off point and the route to the final destination branch off from one another, the navigation device notifies the user of the route to the stop-off point at the branch point, and hence, the user can select to head for the stop-off point by referring to the notification contents. At that time, the stop-off point is set by a genre such as gas stations and convenience stores, and is selected from among the facilities of the genre based on the route to the final destination. Therefore, the user can head for the stop-off point within a range that is not a long way round for the user in order to arrive at the final destination. Further, when it is detected that the user is not heading for the final destination but is heading for the stop-off point, route guidance to the stop-off point is automatically started, and in addition, when it is detected that the user arrives at the stop-off point, route guidance to the final destination is automatically restarted. Therefore, it becomes possible for the user to obtain desired information depending on the situation without performing operation of setting the guidance destination in each case.

Further, the navigation device may further include a display section which displays a display screen in which the current position and a route to the guidance destination are superimposed on map information in accordance with a control of the route guidance section. The route guidance section may cause the display section to display a screen in which an arrow indicating a direction that leads to the stop-off point is superimposed at the branch point between the route to the final destination and the route to the stop-off point on the display screen.

Further, when the route guidance section detects the arrival at the stop-off point, the stop-off point selection section may select a stop-off point again from among facilities included in the genre set by the stop-off genre setting section based on a route from a current position at a time point of the detection to the final destination.

Further, when the route guidance section detects that the route to the final destination is selected at the branch point, the stop-off point selection section may select a stop-off point again from among facilities included in the genre set by the stop-off genre setting section based on a route from a current position at a time point of the detection to the final destination.

According to another embodiment of the present invention, there is provided a navigation method which is realized by causing arithmetic processing means of a navigation device to execute predetermined procedures, the procedures including the steps of setting a final destination, setting a genre of a facility to be stopped at before arriving at the final destination, searching for a route from a current position to the final destination, selecting a stop-off point from among facilities included in the genre based on the searched route to the final destination, searching for a route from a current position to the selected stop-off point, showing the route to the final destination, performing notification of a branch point between the route to the final destination and the route to the stop-off point, switching a guidance destination to the stop-off point and showing the route to the stop-off point when detecting that a current position enters the route to the stop-off point from the branch point, and switching the guidance destination to the final destination when detecting arrival at the stop-off point based on position information of a current position.

According to another embodiment of the present invention, there is provided a program for causing a computer to function as a navigation device which includes a position information acquisition section which acquires position information of a current position, a final destination setting section which sets a final destination, a stop-off genre setting section which sets a genre of a facility to be stopped at before arriving at the final destination, a stop-off point selection section which selects a stop-off point from among facilities included in the genre set by the stop-off genre setting section based on a route from the current position to the final destination, a route search section which searches for the route from the current position to the final destination and a route from the current position to the stop-off point, and a route guidance section which performs notification of the route to the stop-off point at a branch point between the route to the final destination and the route to the stop-off point while showing the route to the final destination, when detecting that the position information of the current position acquired by the position information acquisition section enters the route to the stop-off point from the branch point, switches a guidance destination to the stop-off point and shows the route to the stop-off point, and when detecting arrival at the stop-off point based on the position information acquired by the position information acquisition section, switches the guidance destination to the final destination.

According to the embodiments of the present invention described above, it is possible to show a route either to a final destination or to a stop-off point automatically depending on the situation the user is in.

DETAILED DESCRIPTION OF THE EMBODIMENTS

Figure 1:
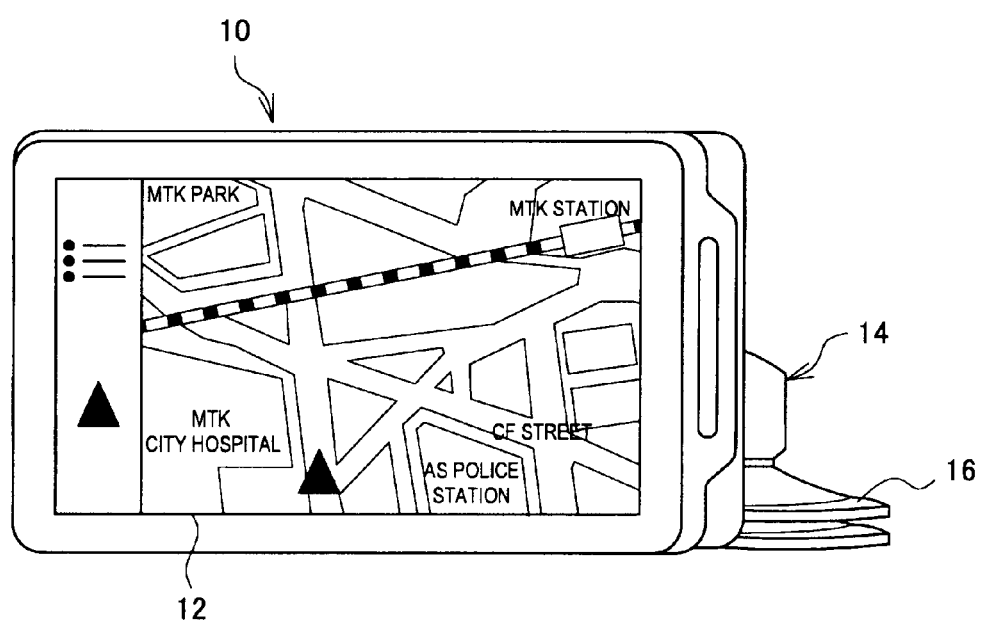
FIG. 1 is an external view of a personal navigation device (PND) according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. First embodiment (PND)
1-1. Configuration of PND
1-2. Navigation method
1-3. Specific examples of navigation
2. Second embodiment (mobile phone)
3. Summary 1. First Embodiment

PND

[1-1. Configuration of PND]

First, with reference to FIG. 1, a configuration of a PND (Personal Navigation Device), which is a navigation device according to a first embodiment of the present invention, will be described. FIG. 1 is an external view of the PND according to the first embodiment of the present invention.

A PND 10 according to the first embodiment of the present invention is a portable navigation device which has functions of showing a route to a destination and providing a user with various pieces of information each associated with position information. As shown in FIG. 1, the PND 10 has a display section 12, and is held by a cradle 14 which is attached to a dashboard of a vehicle via a suction cup 16. The PND 10 and the cradle 14 are mechanically and electrically connected to each other. Therefore, the PND 10 is configured to operate by power supplied from a vehicle battery via the cradle 14, and, when detached from the cradle 14, the PND 10 is also configured to operate independently by power supplied from a built-in battery.

The PND 10 has a function of acquiring a current position, and stores map data. Therefore, the PND 10 can display on the display section 12 the information of the current position in a superimposed manner on a map.

Figure 2:
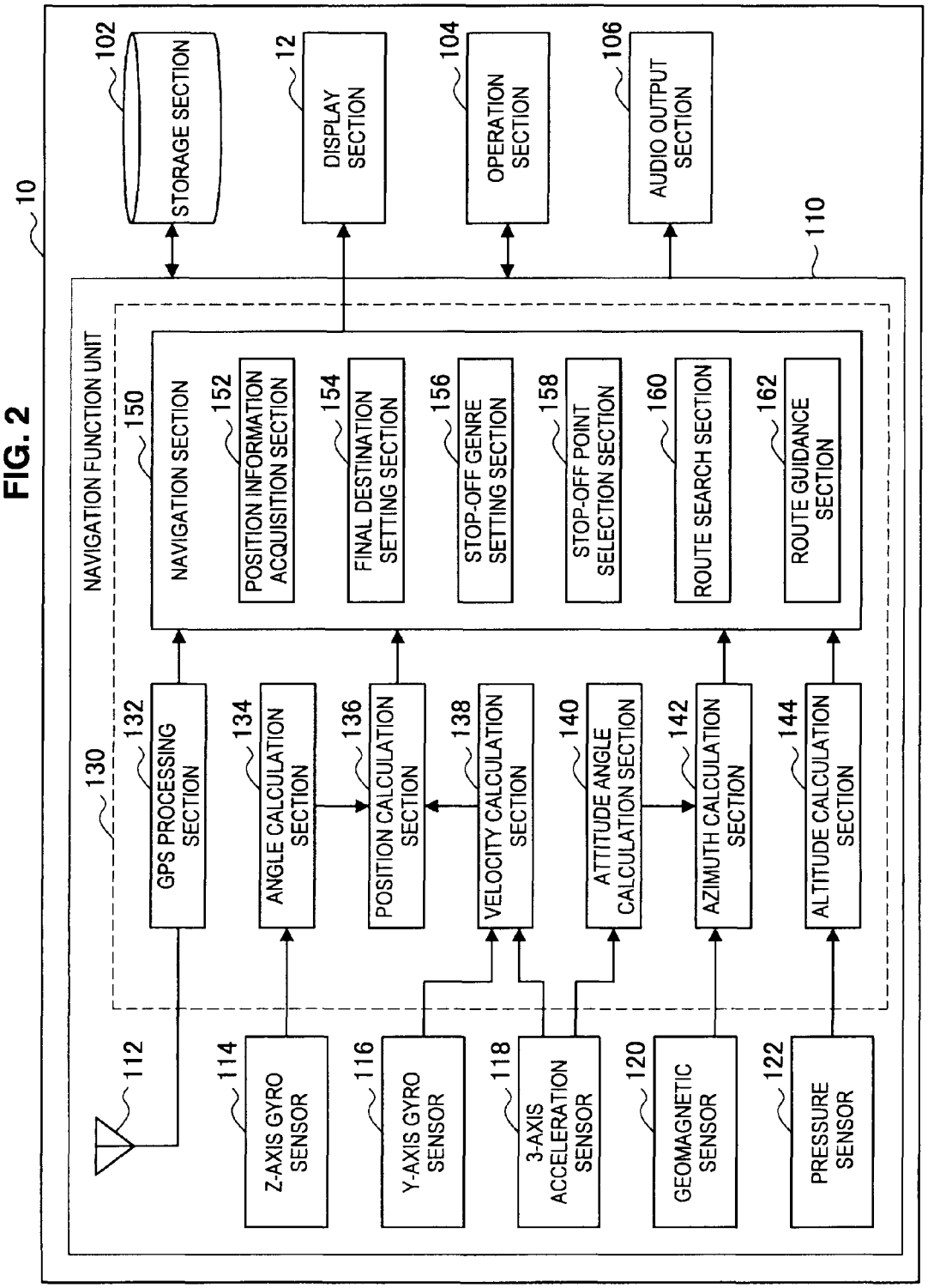
FIG. 2 is a functional block diagram of the PND according to the first embodiment.

Next, with reference to FIG. 2, a functional configuration of the PND 10 will be described. FIG. 2 is a functional block diagram of the personal navigation device (PND) according to the first embodiment.

The PND 10 mainly includes a storage section 102, the display section 12, an operation section 104, an audio output section 106, and a navigation function unit 110.

The storage section 102 is a storage medium which stores a program for the PND 10 to operate and position metadata such as map data and POI (Point Of Interest) information.

Note that the storage section 102 may be, for example, a storage medium such as a non-volatile memory such as a Flash ROM (or Flash Memory), an EEPROM (Electrically Erasable Programmable Read-Only Memory), and an EPROM (Erasable Programmable ROM), a magnetic disk such as a hard disk and disc-like magnetic disk, an optical disk such as a CD (Compact Disc), a DVD-R (Digital Versatile Disc Recordable), and a BD (Blu-Ray Disc (registered trademark)), and an MO (Magneto Optical) disk.

The display section 12 is a display device which outputs a screen in which information indicating a current position is superimposed on map data. The display section 12 may be a display device such as an LCD (Liquid Crystal Display) and an organic EL (Electroluminescence) display.

The operation section 104 accepts an operation instruction from the user, and outputs the operation contents to the navigation function unit 110. Examples of the operation instruction by the user include setting a destination, enlarging/reducing the scale of a map, setting a vocal guidance, setting a screen display, and setting a stop-off point genre.

Further, the operation section 104 may be a touch screen which is provided in an integrated manner with the display section 12. Alternatively, the operation section 104 may have a physical configuration such as a button, a switch, and a lever, which is provided separately from the display section 12. Further, the operation section 104 may be a signal reception section which detects a signal indicating an operation instruction by the user transmitted from a remote controller.

The audio output section 106 is an output device which outputs audio data, and may be a speaker and the like. The audio output section 106 outputs navigation audio guidance, for example. The user listens to the audio guidance, which enables the user to find out the route to a destination even without watching the display section 12.

The navigation function unit 110 is a configuration for realizing a navigation function, and mainly includes a GPS antenna 112, a Z-axis gyro sensor 114, a Y-axis gyro sensor 116, a 3-axis acceleration sensor 118, a geomagnetic sensor 120, a pressure sensor 122, and a control section 130. The control section 130 includes arithmetic processing means such as a CPU (Central Processing Unit). Further, the control section 130 mainly includes a GPS processing section 132, an angle calculation section 134, a position calculation section 136, a velocity calculation section 138, an attitude angle calculation section 140, an azimuth calculation section 142, an altitude calculation section 144, and a navigation section 150.

The GPS antenna 112 is capable of receiving GPS signals from multiple GPS satellites, and inputs the received GPS signals to the GPS processing section 132. Note that the GPS signals received here include orbital data indicating orbits of the GPS satellites and information such as transmission time of the signals.

The GPS processing section 132 calculates position information indicating the current position of the PND 10 based on the multiple GPS signals input from the GPS antenna 112, and supplies the navigation section 150 with the calculated position information. Specifically, the GPS processing section 132 calculates a position of each of the GPS satellites from the orbital data obtained by demodulating each of the multiple GPS signals, and calculates a distance between each of the GPS satellites and the PND 10 from a difference between a transmission time and a reception time of the GPS signal. Then, based on the calculated positions of the respective GPS satellites and the distances from the respective GPS satellites to the PND 10, a current three-dimensional position is calculated.

In this way, the navigation section 150 is capable of executing navigation processing based on the position information supplied by the GPS processing section 132. However, in the case where it is difficult to receive the GPS signals from the GPS satellites, it may be impossible for the PND 10 to perform the positioning using the GPS. Consequently, the PND 10 is also capable of executing, mainly when it is difficult to receive the GPS signals, navigation processing by using position information obtained by the following sensors and calculation sections.

Figure 3:
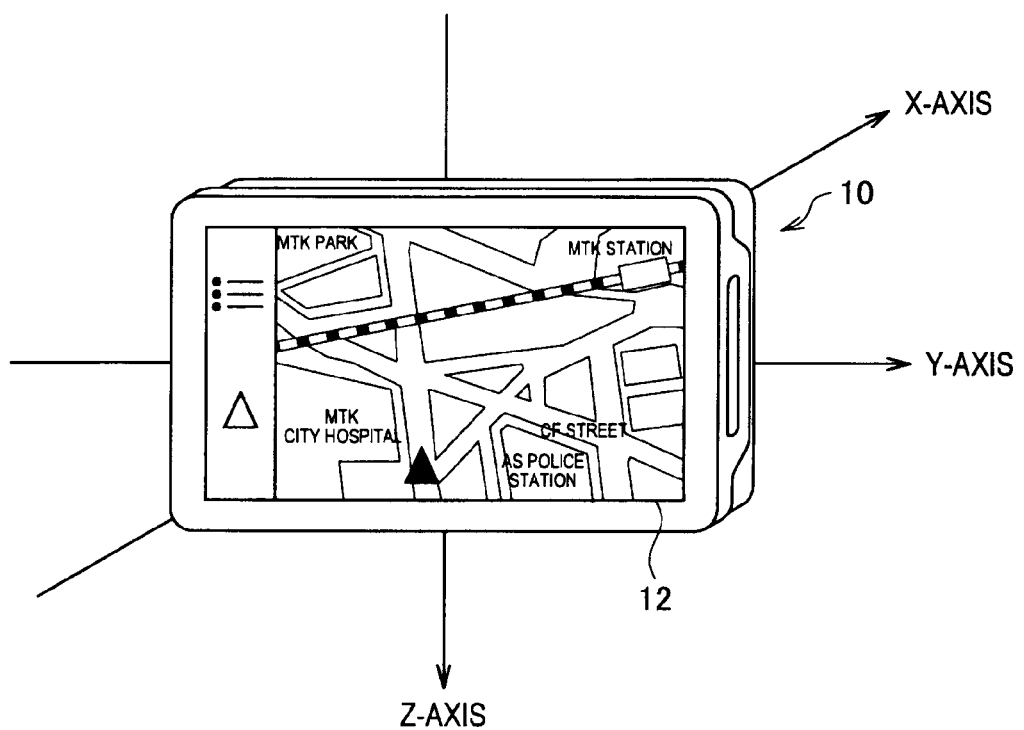
FIG. 3 is an explanatory diagram showing a definition of a coordinate system of the PND.

The Z-axis gyro sensor 114 is a sensor having a function of detecting, as a voltage value, a yaw rate $\omega_z$ which is a variable velocity (angular velocity) of the rotation angle around the Z-axis when the PND 10 is rotated. The Z-axis gyro sensor 114 detects the yaw rate at a sampling frequency of 50 Hz, for example, and inputs data indicating the detected yaw rate to the angle calculation section 134. Note that, as shown in FIG. 3, the Z-axis corresponds to the vertical direction. The X-axis corresponds to a travelling direction of the PND 10, and the Y-axis corresponds to the horizontal direction that is perpendicular to the X-axis.

The angle calculation section 134 calculates an angle θ of when the PND 10 is rotated by multiplying the yaw rate $\omega_z$ input from the Z-axis gyro sensor 114 by a sampling frequency (here, for example, 0.02 s), and inputs angle data indicating the angle θ to the position calculation section 136.

The Y-axis gyro sensor 116 is a sensor having a function of detecting, as a voltage value, a pitch rate $\omega_y$ which is an angular velocity around the Y-axis. The Y-axis gyro sensor 116 detects the pitch rate at a sampling frequency of 50 Hz, for example, and inputs data indicating the detected pitch rate to the velocity calculation section 138.

The 3-axis acceleration sensor 118 is a sensor having a function of detecting, as voltage values, an acceleration rate $\alpha_x$ along the X-axis, an acceleration rate $\alpha_y$ along the Y-axis, and an acceleration rate $\alpha_z$ along the Z-axis. The 3-axis acceleration sensor 118 detects the acceleration rate $\alpha_x$, the acceleration rate $\alpha_y$, and the acceleration rate $\alpha_z$ at a sampling frequency of 50 Hz, for example, and inputs data indicating the detected acceleration rates to the velocity calculation section 138 and the attitude angle calculation section 140.

The velocity calculation section 138 divides the acceleration rate $\alpha_z$ along the Z-axis input from the 3-axis acceleration sensor 118 by the pitch rate $\omega_y$ input from the Y-axis gyro sensor 116, to thereby calculate a velocity V in the travelling direction 50 times per second, for example, and inputs the calculated velocity V to the position calculation section 136.

The position calculation section 136 has a function of calculating position information of a current position based on the velocity V calculated by the velocity calculation section 138 and the angle θ calculated by the angle calculation section 134. Specifically, the position calculation section 136 calculates an amount of change from the position at the previous calculation to the current position based on the velocity V and the angle θ. Then, the position calculation section 136 calculates current position information from the amount of change and the previous position. After that, the position calculation section 136 supplies the navigation section 150 with the position information of the current position.

The attitude angle calculation section 140 generates, to begin with, attitude angle data indicating an attitude angle of the PND 10 by performing a predetermined attitude angle detection processing based on the acceleration rate data $\alpha_x$, $\alpha_y$, and $\alpha_z$ which are input from the 3-axis acceleration sensor 118, and inputs the attitude angle data to the azimuth calculation section 142.

The geomagnetic sensor 120 is a sensor having a function of detecting, as voltage values, geomagnetism $M_x$, geomagnetism $M_y$, and geomagnetism $M_z$ in the X-axis direction, the Y-axis direction, and the Z-axis direction, respectively. The geomagnetic sensor 120 inputs the detected geomagnetism data $M_x$, $M_y$, and $M_z$ to the azimuth calculation section 142.

The azimuth calculation section 142 performs a predetermined correction processing to the geomagnetism data $M_x$, $M_y$, and $M_z$ input from the geomagnetic sensor 120, and generates azimuth data indicating an azimuth of the PND 10 based on the corrected geomagnetism data and the attitude angle data input from the attitude angle calculation section 140. The azimuth calculation section 142 supplies the navigation section 150 with the generated azimuth data.

That is, the geomagnetic sensor 120, the 3-axis acceleration sensor 118, the attitude angle calculation section 140, and the azimuth calculation section 142 each function as a so-called electronic compass and generates the azimuth data. Mainly in the case where the PND 10 is used by being detached from the cradle 14 (for example, in the case where the PND 10 is used when the user is walking), the navigation section 150 uses the azimuth data and provides the user with map data which is being displayed in a manner that the direction of the map data is adjusted to the direction of the PND 10. Note that, when the PND 10 is used by being installed in a car, the PND 10 may associate a road in the map data with the car position based on the route of the car position, and may provide the user with the map data, the direction of which is adjusted to the direction of the PND 10 based on the azimuth of the map. Alternatively, there can be provided the user with map data, the direction of which is adjusted to the direction obtained by calculating the direction of the PND 10 using an acquired GPS azimuth.

The pressure sensor 122 is a sensor having a function of detecting, as a voltage value, the surrounding pressure. The pressure sensor 122 detects the detected pressure data at a sampling frequency of 50 Hz, for example, and inputs the detected pressure data to the altitude calculation section 144.

The altitude calculation section 144 calculates the altitude of the PND 10 based on the pressure data input from the pressure sensor 122, and provides the navigation section 150 with the calculated altitude data.

According to the above configuration, the navigation section 150 is capable of acquiring the current position information from the GPS processing section 132 or the position calculation section 136, the azimuth that the PND 10 is heading for from the azimuth calculation section 142, and the altitude of the PND 10 from the altitude calculation section 144. Based on the acquired information, the navigation section 150 acquires map data of the surroundings of the current position from map data stored in the storage section 102, and shows a route to a destination which is set by the user by using the operation section 104, with a display screen of the display section 12 and output audio from the audio output section 106.

The PND 10 according to the present embodiment has a feature in a navigation method. The navigation method in the past involved showing a route to one destination set by a user. When there was a location that the user wants to stop at before arriving at the final destination, it was necessary that the user once set a facility which the user wants to stop at as the destination, and after arriving at the facility, the user perform operation to start again the guide to a final destination.

In such a configuration, it was necessary to perform operation of searching for a destination again in the case where, for example, the facility was in break time or already closed when the user arrives at the facility which the user wants to stop at. It was dangerous to perform such operation particularly in the case where the navigation system was mounted on a car or the navigation system was used on a bicycle or a motorcycle, and hence, it was necessary that the user stop for a moment to perform the operation.

In light of the foregoing, the PND 10 according to the present embodiment is suggested, and according to the PND 10, when the user sets a facility by a genre which the user wants to stop at before arriving at the final destination, the user can find out, while heading for the final destination, the position of the facility that the user wants to stop at in a range that the user does not largely deviate from the route. Then, in the case where the user deviates from the route to the final destination and heads for the facility which the user wants to stop at, the route guidance to the facility which the user wants to stop at is automatically started. In addition, when arriving at the facility which the user wants to stop at, the route guidance to the final destination is automatically started.

A configuration of the navigation section 150 for realizing the functions of the PND 10 will be described below. The navigation section 150 mainly includes a position information acquisition section 152, a final destination setting section 154, a stop-off genre setting section 156, a stop-off point selection section 158, a route search section 160, and a route guidance section 162.

Note that, in the description below: a final destination represents a destination that the user finally wants to arrive at; a stop-off point represents a facility which the PND 10 has selected before arriving at the final destination, from among the facilities included in a genre that the user wants to stop at; and a guidance destination represents the final destination or the stop-off point, and also represents a destination which the PND 10 guides the user to and which is decided depending on the situation. Here, "guidance" means so-called navigation processing, and for example, represents showing a route on a map, showing a direction of a destination at a branch point, and notifying the user of the route by audio guidance. In particular, the guidance is distinguished from the notification of a route to the stop-off point during the route guidance to the final destination.

The position information acquisition section 152 has a function of acquiring position information of a current position. The position information acquisition section 152 may acquire the position information from either the GPS processing section 132 or the position calculation section 136. For example, when the GPS processing section 132 can calculate the position information, the position information acquisition section 152 acquires the position information from the GPS processing section 132, and when it is difficult for the GPS processing section 132 to calculate the position information, that is, when it is difficult for the GPS antenna 112 to receive GPS signals, the position information acquisition section 152 acquires the position information from the position calculation section 136.

The final destination setting section 154 sets a final destination, which is a location that the user finally wants to arrive at, from operation information input by the user using the operation section 104, for example. The final destination setting section 154 generates, for example, a screen for searching for the final destination from addresses, names, telephone numbers, or genres, or a screen for selecting the final destination from the registration points that are registered by the user beforehand, and causes the display section 12 to display the screen. Then, the final destination setting section 154 acquires the operation information performed to the screen display by the user using the operation section 104, and sets the final destination.

The stop-off genre setting section 156 sets a facility which the user wants to stop at before arriving at the final destination set by the final destination setting section 154. At that time, the stop-off genre setting section 156 generates a screen for setting a genre of the stop-off point and causes the display section 12 to display the screen. Then, the stop-off genre setting section 156 acquires the operation information performed to the screen display by the user using the operation section 104, and sets the genre of the stop-off point.

The stop-off point selection section 158 selects a candidate for the stop-off point from among the facilities included in the genre set by the stop-off genre setting section 156 based on a route from a current point to the final destination. More specifically, the stop-off point selection section 158 acquires a route from a current point, which is searched for by the route search section 160, to the final destination, based on a current position at the time point of the acquisition thereof by the position information acquisition section 152 and the final destination set by the final destination setting section 154. Then, based on the acquired route, the stop-off point is selected within a range which is not a long way round for the user in order to arrive at the final destination.

Here, the range which is not a long way round may be defined based on every condition. For example, when there is set a threshold to a difference between time taken for the user to travel from the current position to the final destination via the stop-off point and time taken in the case of travelling the shortest distance from the current position to the final destination, and in the case where the difference is within the threshold, it may be determined to be in the range which is not a long way round. Further, for example, when there is set a threshold to a difference between a distance in the case where the user travels from the current position to the final destination via the stop-off point and a shortest distance from the current position to the final destination, and in the case where the difference is within the threshold, it may be determined to be in the range which is not a long way round. Alternatively, in the case of operating in an in-car mode, a travelling direction of the PND 10 and the left-hand traffic are taken into consideration, and the facilities on the right side of the road the user is currently travelling on may not be selected as the candidates, for example.

Further, although the stop-off point selection section 158 basically selects the stop-off point automatically, the stop-off point selection section 158 may also have a configuration which enables the user to explicitly select the stop-off point based on the operation information input by the user using the operation section 104. In addition, the stop-off point selection section 158 may select not only one but multiple stop-off points as the candidates. The number of the stop-off points to be selected depends mainly on the size, the fineness of pixels, and the color expression ability of the display section 12, and the number is selected in a range that the screen display is easily viewable to the user.

The route search section 160 searches for a route from the current position to the final destination, and a route from the current position to the stop-off point. The route search section 160 has a function of searching for a route at any time in response to a request from the stop-off point selection section 158 or the route guidance section 162, for example.

The route guidance section 162 has a function of showing a route to the guidance destination. For example, in the case where the final destination is set by the final destination setting section 154 and the stop-off point is selected by the stop-off point selection section 158, the route guidance section 162 notifies the user of the route to the stop-off point while showing the route to the final destination. Here, there can be considered various methods as the notification method of the route to the stop-off point. For example, in the case where the stop-off point is included in the map displayed on the display section 12, the route guidance section 162 indicates a position of the stop-off point by showing an icon or the like at the position. Alternatively, in the case where the route to the final destination and the route to the stop-off point branch off from one another, the route guidance section 162 causes the display section 12 to display at the branch point an arrow superimposed on the map, which indicates the direction of the stop-off point.

Then, when detecting that the user is not heading for the final destination but is heading for the stop-off point, the route guidance section 162 starts route guidance to the stop-off point. Specifically, when the route guidance section 162 detects, from the current position acquired by the position information acquisition section 152, that the position of the PND 10 enters the route to the stop-off point from the branch point between the route to the final destination and the route to the stop-off point, the route guidance section 162 switches the guidance destination from the final destination to the stop-off point. On the other hand, when detecting that the user is not heading for the stop-off point and is heading for the final destination, the route guidance section 162 instruct the stop-off point selection section 158 to select a next stop-off point.

In addition, when detecting that the PND 10 arrives at the stop-off point which is set to the guidance destination, the route guidance section 162 switches the guidance destination to the final destination. Then, when detecting that the PND 10 has arrived at the stop-off point which is set to the guidance destination, the route guidance section 162 instructs the stop-off point selection section 158 to select a next stop-off point.

[1-2. Navigation Method]

Figure 4:
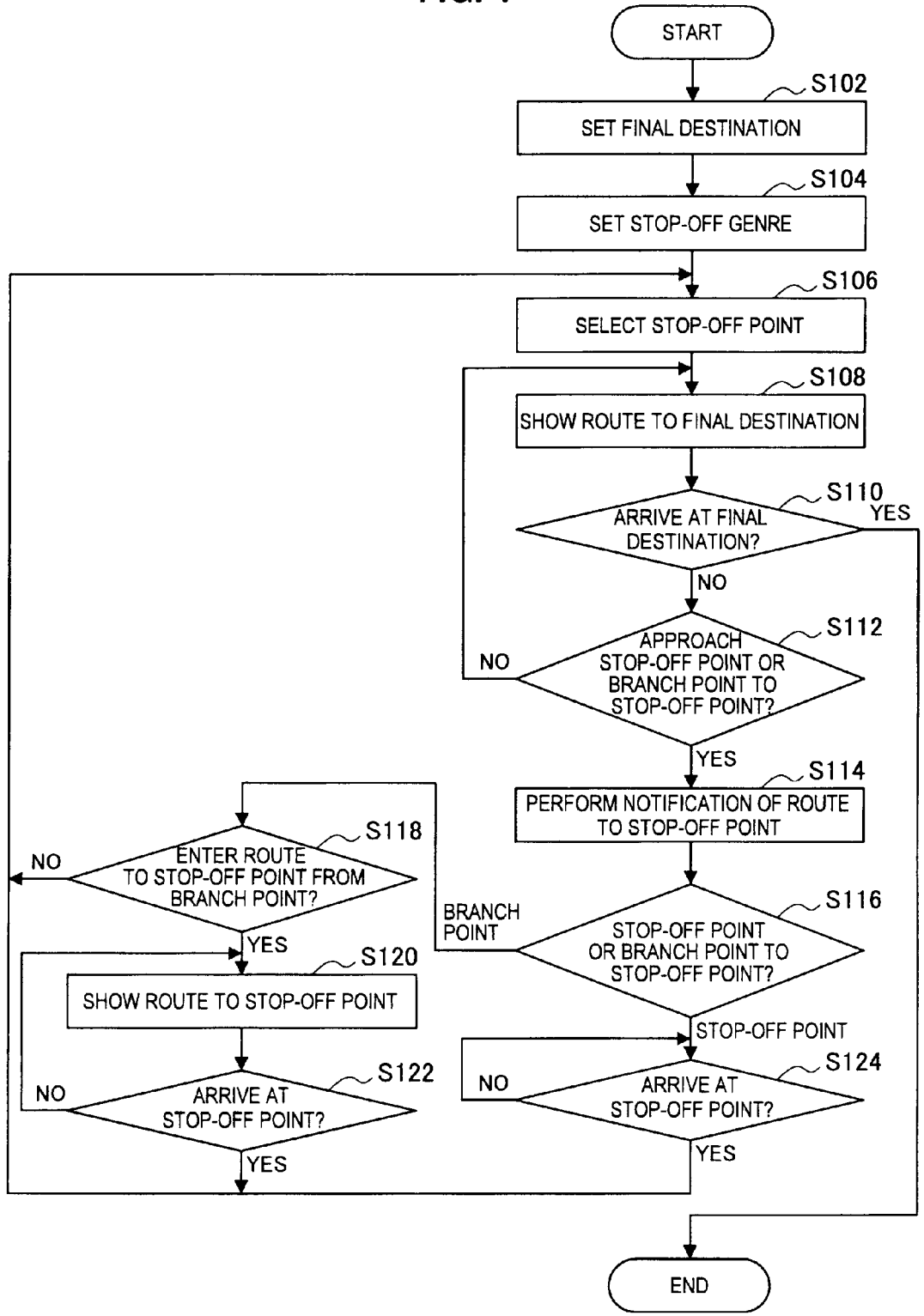
FIG. 4 is a flowchart showing a navigation method according to the first embodiment.

Next, with reference to FIG. 4, a navigation method according to the present embodiment will be described. FIG. 4 is a flowchart showing a navigation method according to the first embodiment of the present invention.

As shown in FIG. 4, the final destination setting section 154 of the PND 10 sets a final destination based on user operation (S102). Specifically, when the user performs the operation of selecting a menu for setting the final destination by using the operation section 104, the final destination setting section 154 generates a screen for setting the final destination and causes the display section 12 to display the screen. Then, when the user performs the operation of setting the final destination by using the operation section 104 on the screen for setting the final destination which is displayed on the display section 12, the final destination setting section 154 acquires the operation information and sets the final destination.

Further, the stop-off genre setting section 156 sets a stop-off genre based on the user operation (S104). That is, when the user performs the operation of selecting a menu for setting the stop-off point by using the operation section 104, the stop-off genre setting section 156 generates a screen for setting a genre of the stop-off point and causes the display section 12 to display the screen. The genre used here refers to the kind of the facility, such as a convenience store and a gas station. Then, when the user performs the operation of setting the stop-off genre by using the operation section 104 on the screen for setting the stop-off genre which is displayed on the display section 12, the stop-off genre setting section 156 acquires the operation information and sets the stop-off genre.

Note that, the setting of the final destination in Step S102 and the setting of the stop-off genre in Step S104 may be executed in the order stated in FIG. 4, or the stop-off genre may be set first. In that case, because the stop-off point can be set only under the condition that the final destination is present, it may be configured in a manner that, after setting the stop-off genre, the screen may automatically be switched to the final destination setting screen.

Next, the stop-off point selection section 158 selects, by taking into consideration the route to the final destination, a stop-off point within a range that it is not a long way round as much as possible that the user stopping at the stop-off point (S106). At the same time, the route guidance section 162 shows a route from the current position to the final destination (S108). Here, the route guide to the final destination may be started soon after the setting of the final destination in Step S102. Then, route guidance section 162 determines as needed whether or not the PND 10 arrives at the final destination based on the current position at the time point of the acquisition thereof by the position information acquisition section 152 (S110). In Step S110, when it is detected that the PND 10 arrives at the final destination, the navigation section 150 completes the navigation processing.

On the other hand, when the PND 10 does not yet arrive at the final destination, the route guidance section 162 determines whether or not the PND 10 approaches the stop-off point or a branch point that leads to the stop-off point (S112). Specifically, for example, the route guidance section 162 determines whether or not the branch point or the stop-off point is present on the screen displayed on the display section 12, the branch point being a point at which the following routes branch off from one another: a route from a current position, which is searched for by the route search section 160, to the final destination; and a route from the current position to the stop-off point. Here, in the case where neither the branch point nor the stop-off point is present on the screen displayed on the display section 12, the route guidance to the final destination in Step S108 is continued.

On the other hand, in the case where it is determined in Step S112 that the branch point or the stop-off point is present on the screen displayed on the display section 12, the route guidance section 162 causes the route to the stop-off point to be displayed on the display screen (S114). For example, as for the display of the route to the stop-off point, an arrow indicating a direction of the stop-off point may be displayed in a superimposed manner on the map at the branch point. The shape of the arrow displayed here may be any as long as it indicates a direction, and is not limited. For example, in addition to a generally used arrow (→), the arrow is a concept which includes various symbols (<, >, ▼, ▲) which are each capable of indicating a direction, an illustration of a pointing hand, and the like. Alternatively, in the case of the stop-off point itself, the route guidance section 162 may cause an icon indicating the stop-off point to be displayed at the position of the stop-off point on the map of the display screen.

Then, it is determined whether a point which the current position of the PND 10 approaches is the stop-off point or the branch point that leads to the stop-off point (S116). In the case where it is determined in Step S116 that the current position of the PND 10 approaches the branch point that leads to the stop-off point, then the route guidance section 162 detects whether or not the position of the PND 10 deviates from the route to the final destination and enters the route to the stop-off point from the branch point, based on the change of the current position of the PND 10 in the vicinity of the branch point (S118). Then, in the case where it is detected in Step S118 that the PND 10 continuously travels along the route to the final destination from the branch point, the route guidance section 162 determines that the PND 10 does not stop at the set stop-off point, and instruct the stop-off point selection section 158 to select a next stop-off point.

On the other hand, in the case where it is determined in Step S118 that the route guidance section 162 detects that the PND 10 enters the route to the stop-off point from the branch point, the route guidance section 162 switches the guidance destination to the stop-off point and starts route guidance to the stop-off point (S120). Then, the route guidance section 162 determines as needed whether or not the PND 10 arrives at the stop-off point (S122), and continues the route guidance to the stop-off point until the PND 10 arrives at the stop-off point. Then, in the case where it is determined in Step S122 that the PND 10 arrives at the stop-off point, the route guidance section 162 switches the guidance destination to the final destination, and instructs the stop-off point selection section 158 to select a candidate for a next stop-off point, and the processing returns to the stop-off point selection processing of Step S106 performed by the stop-off point selection section 158.

On the other hand, in the case where it is determined by the route guidance section 162 in Step S116 that the PND 10 approaches the stop-off point, that is, in the case where there is a stop-off point on the route to the final destination and the PND 10 approaches the stop-off point, the route guidance section 162 determines whether or not the PND 10 arrives at the stop-off point from the current position of the PND 10 (S124) while notifying the user of the route to the stop-off point as described in Step S114. Then, in the case where the PND 10 arrives at the stop-off point, the route guidance section 162 instructs the stop-off point selection section 158 to select a next stop-off point while continuously showing the route to the final destination, and the processing returns to the stop-off point selection processing of Step S106 performed by the stop-off point selection section 158.

[1-3. Specific Examples of Navigation]

Figure 5:
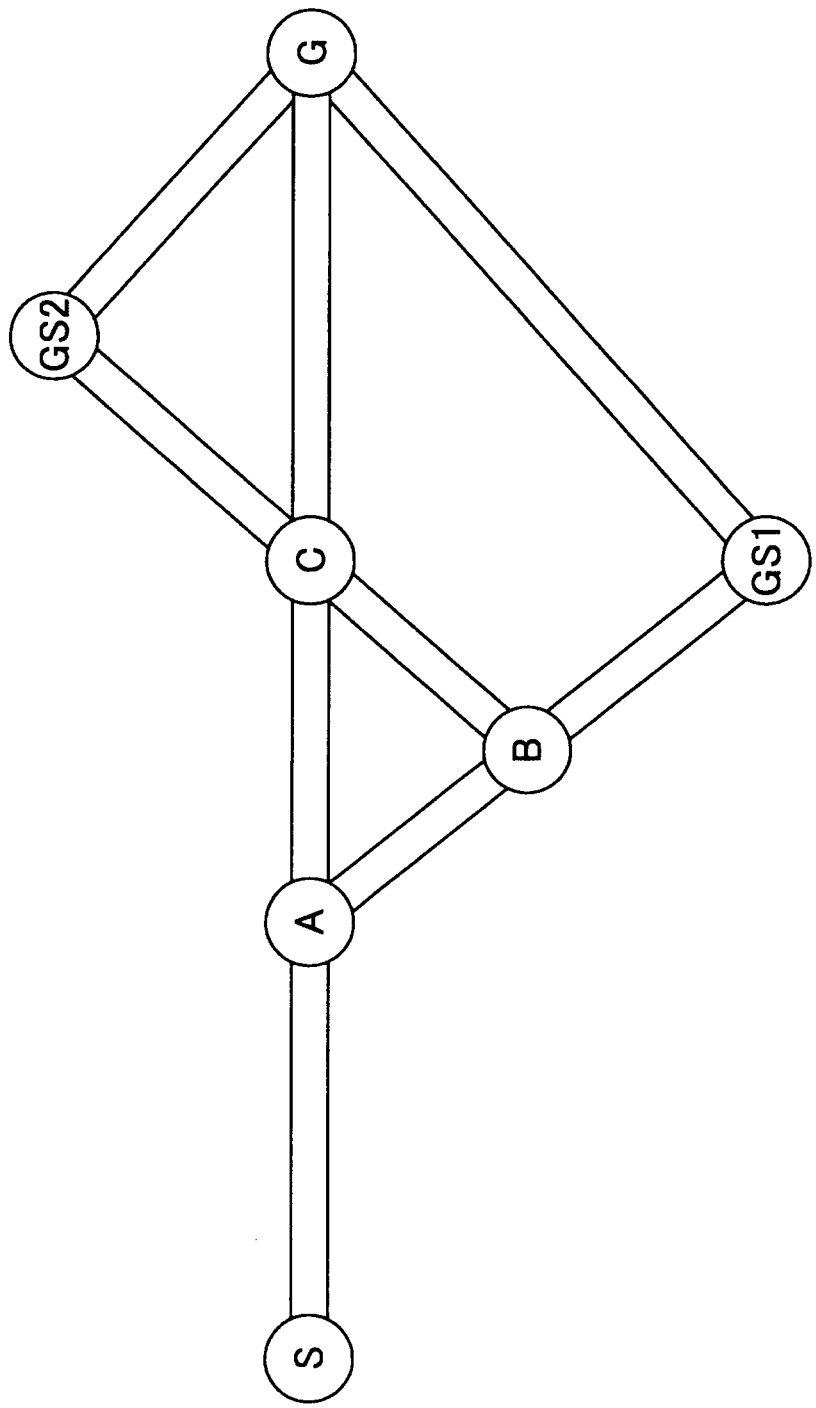
FIG. 5 is an explanatory diagram illustrating an example of the navigation method.
Figure 6:
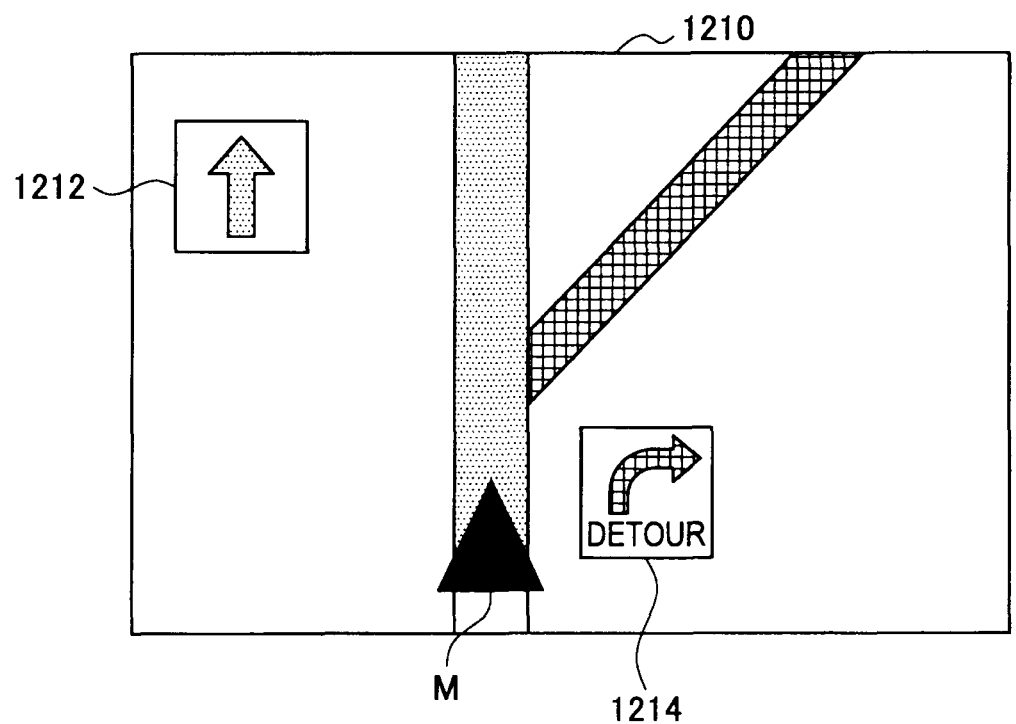
FIG. 6 is an explanatory diagram showing a specific example of a navigation screen of the example in FIG. 5.
Figure 7:
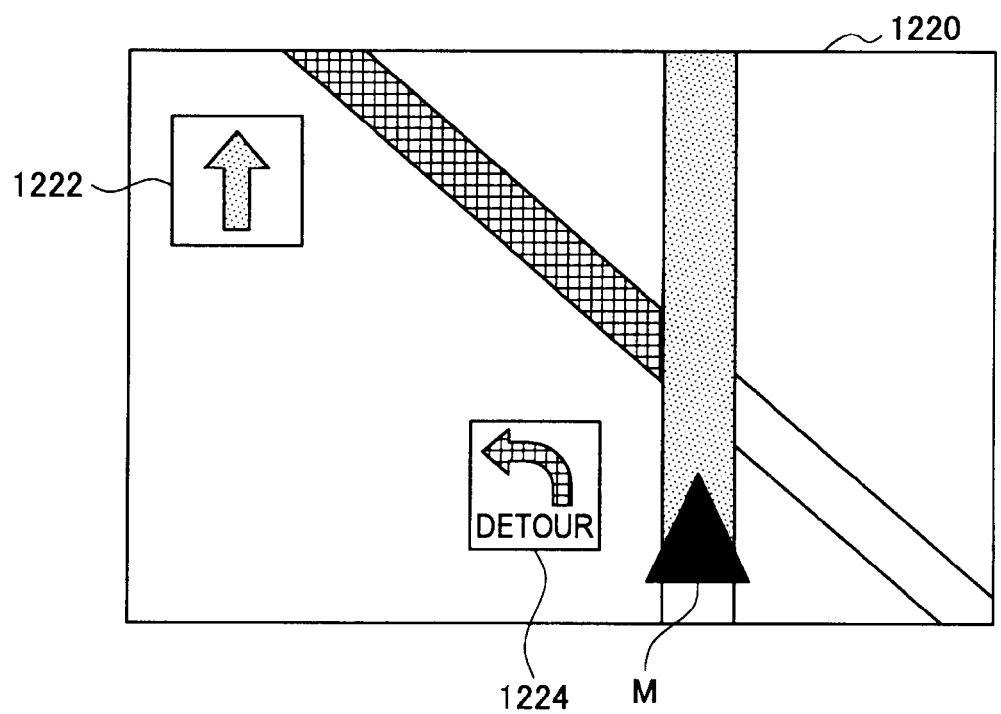
FIG. 7 is an explanatory diagram showing a specific example of the navigation screen of the example in FIG. 5.
Figure 8:
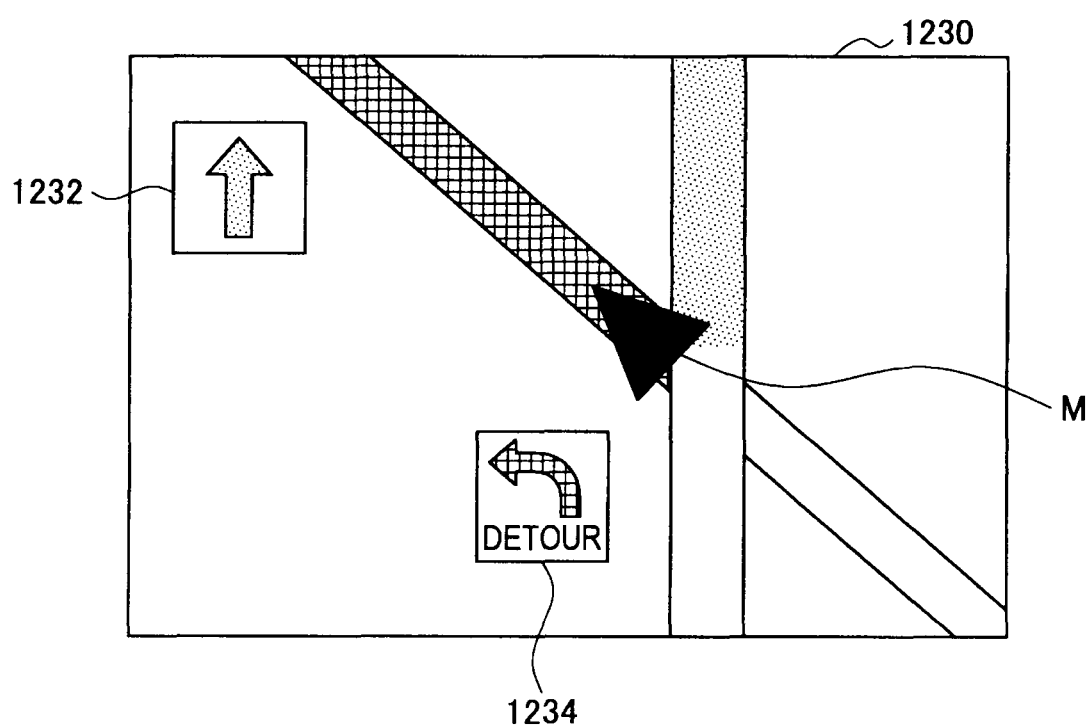
FIG. 8 is an explanatory diagram showing a specific example of the navigation screen of the example in FIG. 5.

Next, with reference to FIGS. 5 to 8, the navigation processing which has been described heretofore will be further described by using specific examples. FIG. 5 is an explanatory diagram illustrating an example of the navigation method according to the present embodiment. Further, FIGS. 6 to 8 are each an explanatory diagram showing a specific example of a navigation screen according to the present embodiment.

First, FIG. 5 shows: routes from a start point S to a goal point G; a point A, a point B, and a point C which are in between the start point S and the goal point G; and a gas station GS1 and a gas station GS2 which are candidates for the stop-off point. Hereinafter, there will be described a case where the user sets, at the start point S shown in FIG. 5, the final destination to the goal point G and the stop-off genre to a gas station.

First, when the user sets, at the start point S, the goal point G serving as the final destination and the gas station serving as the stop-off genre by using the operation section 104 of the PND 10, the route search section 160 of the PND 10 searches for a route to the goal point G serving as the final destination, and the stop-off point selection section 158 selects, based on the route, a gas station as the stop-off point which is located on the route from the current position to the goal point G or within a range slightly deviated from the route. Here, the gas station GS1 is selected as a first stop-off point.

Then on a screen 12 of the PND 10, there are displayed a map of the surroundings of a current point, a current position M of the PND 10 on the map, and a route to the goal point G which is the final destination. Then, when the current position of the PND 10 approaches the point A, the route guidance section 162 causes the display section 12 to display a screen shown in FIG. 6. A screen 1210 shown in FIG. 6 includes a map of the surroundings of the current position (vicinity of the point A) of the PND 10, the current position M of the PND 10 on the map, a guide sign 1212 indicating a direction of a route to the final destination, and a detour sign 1214 indicating a direction of a route to the stop-off point. At that time, in accordance with usual system settings, the route guidance section 162 may show the route to the goal point G serving as the final destination by audio guidance, for example.

There can be considered various methods as the notification method of the route to the stop-off point. For example, in the example shown in FIG. 6, the notification is performed only at the branch point, but is not limited thereto. The methods can be contrived in various ways in a range that the route to the stop-off point is clearly distinguished from the route to the final destination.

In the case where the user selects, at the point A, to travel straight ahead without stopping at the gas station GS1, the route guidance section 162 instructs the stop-off point selection section 158 to select a next stop-off point. Then, the stop-off point selection section 158 selects the gas station GS2 as the next stop-off point based on the current position at that time point and the route to the goal point G serving as the final destination. In this case, when the current position of the PND 10 approaches the point C next, the route guidance section 162 causes a screen 1220 shown in FIG. 7, for example, to be displayed on the display section 12 in the same manner as in the case of the display at the point A.

The screen 1220 includes a map of the surroundings of the current position (vicinity of the point C) of the PND 10, the current position M of the PND 10 on the map, a guide sign 1222 indicating a direction of a route to the final destination, and a detour sign 1224 indicating a direction of a route to the stop-off point. With the guide sign 1222 and the detour sign 1224, the user can recognize that travelling straight ahead will lead to the final destination and turning left will lead to the gas station serving as the stop-off point.

When the user selects, at the point C, to head for the gas station GS2 serving as the stop-off point, the route guidance section 162 detects from the information of the current position M of the PND 10 that the PND 10 enters not the route to the final destination but the route to the stop-off point as shown in FIG. 8, for example. Then, when it is determined that the PND 10 heads for the stop-off point, the route guidance section 162 sets the guidance destination to the gas station GS2 serving as the stop-off point, and starts the route guidance to the gas station GS2.

After that, when detecting that the PND 10 arrives at the gas station GS2, route guidance section 162 sets the guidance destination to the goal point G serving as the final destination. Then, the stop-off point selection section 158 selects a next stop-off point. In the example of FIG. 5, because there is no candidate for the next stop-off point between the gas station GS2 and the goal point G, only the route to the final destination is shown.

2. Second Embodiment

Mobile Phone

In the above, the case where the PND 10 is used as the navigation device has been described as the first embodiment, but the navigation device is not limited to such an example. For example, a mobile phone 30, which will be described below as a second embodiment, may be used as the navigation device.

Figure 9:
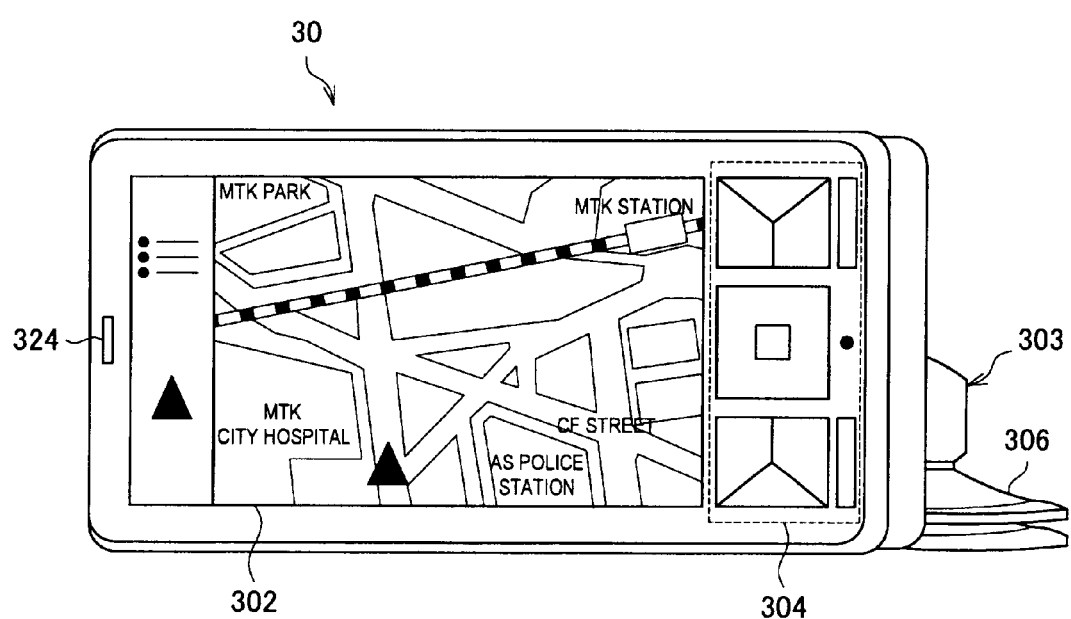
FIG. 9 is an external view of a navigation device (mobile phone) according to a second embodiment.

FIG. 9 is an external view of the mobile phone 30 according to the second embodiment. As shown in FIG. 9, the mobile phone 30 according to the second embodiment includes a display section 302, an operation section 304, and a speaker 324. Further, in the same manner as the PND 10 according to the first embodiment, the mobile phone 30 may be attached to a vehicle using a suction cup 306 via a cradle 303.

Figure 10:
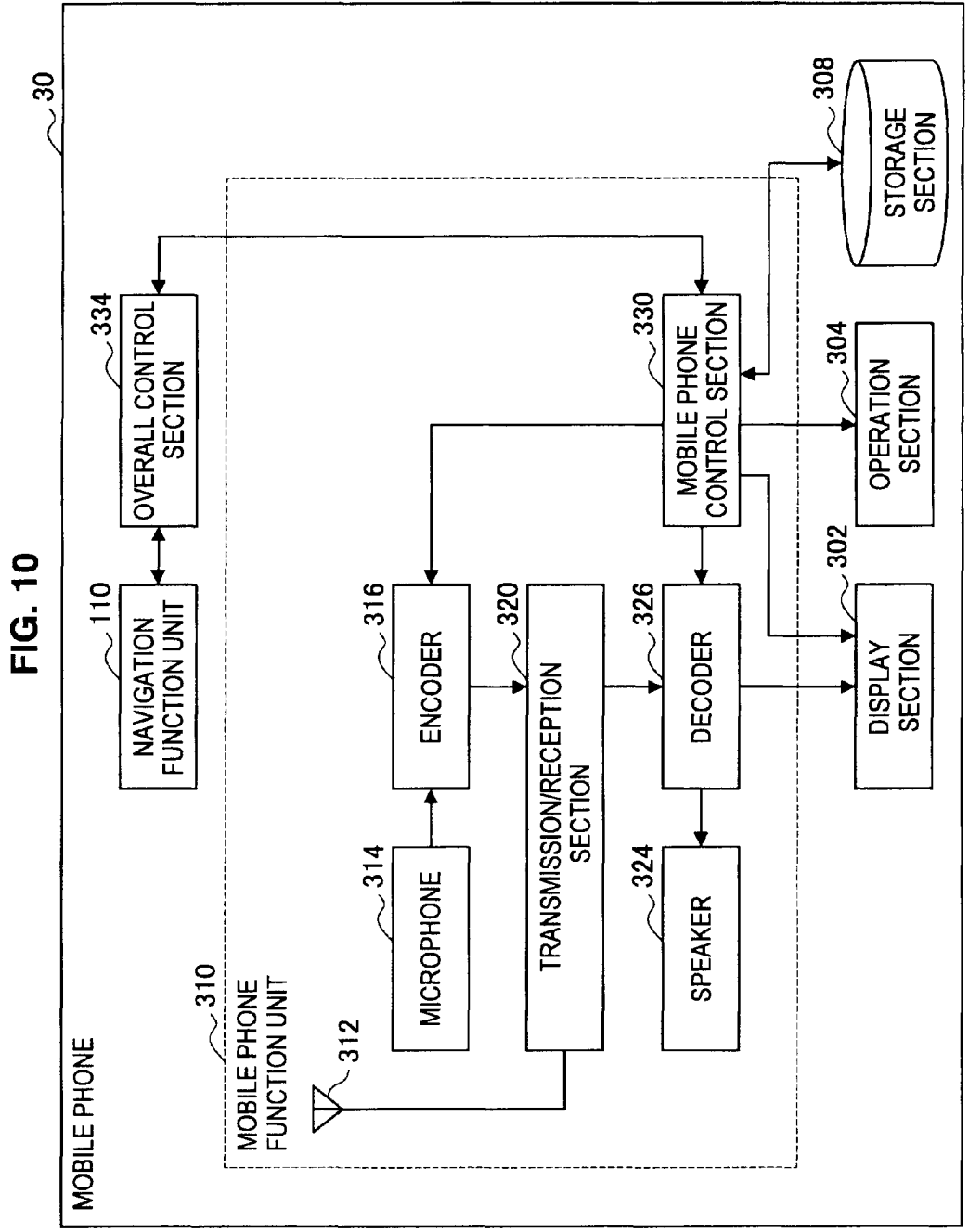
FIG. 10 is a functional block diagram of the mobile phone according to the second embodiment.

FIG. 10 is a functional block diagram of the mobile phone 30 according to the second embodiment. As shown in FIG. 10, the mobile phone 30 according to the second embodiment includes a navigation function unit 110, the display section 302, the operation section 304, a storage section 308, a mobile phone function unit 310, and an overall control section 334.

The mobile phone function unit 310 is connected to the display section 302, the operation section 304, and the storage section 308. In fact, although it is simplified in the drawing of FIG. 10, the display section 302, the operation section 304, and the storage section 308 are each connected to the navigation function unit 110. Note that, since the detailed configuration of the navigation function unit 110 has been specifically described in the first embodiment by using FIG. 1, the description thereof will be omitted here.

The mobile phone function unit 310 has a configuration for realizing a communication function and an e-mail function, and includes a communication antenna 312, a microphone 314, an encoder 316, a transmission/reception section 320, the speaker 324, a decoder 326, and a mobile phone control section 330.

The microphone 314 collects sound and outputs the sound as an audio signal. The encoder 316 performs digital conversion and encoding of the audio signal input from the microphone 314 in accordance with the control of the mobile phone control section 330, and outputs audio data to the transmission/reception section 320.

The transmission/reception section 320 modulates the audio data input from the encoder 316 in accordance with a predetermined system, and transmits the modulated audio data to a base station of the mobile phone 30 from the communication antenna 312 via radio waves. Further, the transmission/reception section 320 demodulates a radio signal received by the communication antenna 312 and acquires audio data, and outputs the audio data to the decoder 326.

The decoder 326 performs decoding and analog conversion of the audio data input from the transmission/reception section 320 in accordance with the control of the mobile phone control section 330, and outputs an audio signal to the speaker 324. The speaker 324 outputs the audio based on the audio signal supplied from the decoder 326.

Further, in the case of receiving an e-mail, the mobile phone control section 330 supplies the decoder 326 with received data from the transmission/reception section 320, and causes the decoder 326 to decode the received data. Then, the mobile phone control section 330 outputs e-mail data obtained by the decoding to the display section 302 and causes the display section 302 to display the e-mail data, and also records the e-mail data in the storage section 308.

Further, in the case of transmitting an e-mail, the mobile phone control section 330 causes the encoder 316 to encode the e-mail data which is input via the operation section 304, and transmits the encoded e-mail data via radio waves through the transmission/reception section 320 and the communication antenna 312.

The overall control section 334 controls the mobile phone function unit 310 and the navigation function unit 110. For example, in the case of receiving a phone call while the navigation function unit 110 is executing a navigation function, the overall control section 334 may temporarily switch its function from the navigation to a verbal communication by the mobile phone function unit 310, and, when the call ends, may cause the navigation function unit 110 to restart the navigation function.

3. Summary

As described above, the navigation device according to the embodiments of the present invention is a completely novel navigation device in which concepts of final destination and stop-off point are introduced. In the past, a location set as a destination was necessarily a guidance destination which a user was to be guided to. However, in such a configuration, it was difficult to respond to an obscure request, for example, a request that the user wants to stop somewhere before arriving at a final destination, but the place was not at an explicitly desired location.

Accordingly, the final destination and the destination which a user is to be guided to are separated from each other as different concepts, and the navigation device automatically sets any one of the stop-off point and the final destination as a guidance destination depending on the situation. According to such a configuration, the user can find out a route to the stop-off point while receiving route guidance to the final destination in the same manner as in the past, only by setting the final destination and the genre of the stop-off point and not performing any setting operation thereafter. At that time, by taking into consideration the route to the final destination, a stop-off point is selected within a range that it is not a long way round, therefore, even when the user makes a detour to the stop-off point, the user can find out automatically an efficient route.

In addition, when the user arrives at the selected stop-off point, the guidance destination is automatically set as the final destination, and also, a next stop-off point is selected. Consequently, when the user finishes a job at the stop-off point which the user has arrived at, the guiding to the final destination is started without performing operation of changing the destination. Further, even when the facility of the stop-off point which the user has arrived at is shut down or closed, or is not the facility that the user desires, the next stop-off point is automatically selected and the user is notified of the next stop-off point, and hence, the user can obtain desired information without performing the operation.

Further, at the branch point between the route to the final destination and the route to the stop-off point, there is displayed a sign each indicating the direction of the route to the final destination or the direction of the route to the stop-off point, and here, when the user travels the route to the final destination, the next stop-off point is automatically selected. Therefore, the user may not necessarily head for the nearest stop-off point at the time point of performing the setting, and can acquire information of the stop-off point at a timing the user desires until the user arrives at a desired stop-off point. According to such a configuration, when the user sets a gas station as the stop-off genre at the time point of setting the final destination, for example, the user can find out the route to a gas station as needed during the route guidance to the final destination. Then, while looking at reduction in the amount of gasoline, the user can see the information that the user is notified of and can enter the gas station at desired timing.

It should be understood by those skilled in the art that various modifications, combinations, sub-combinations and alterations may occur depending on design requirements and other factors insofar as they are within the scope of the appended claims or the equivalents thereof.

For example, in the first embodiment, there has been described the PND 10 which is a portable navigation device, but the present invention is not limited thereto. For example, the configuration of the PND 10 may be applied to a navigation device which is mounted on and fixed to a vehicle. Further, the navigation devices described in the embodiments are each merely an example of the navigation device, and may be a PHS, a portable music reproduction device, a portable video processing device, a portable game device, and a portable imaging device, for example.

Further, for example, although there have been described in the embodiments the examples of acquiring the current position using a GPS measurement and a sensor, the present invention is not limited thereto. For example, the current position can be acquired by using signal strength of WiFi radio waves transmitted from wireless LAN base stations. More specifically, the PND 10 estimates distances from the respective base stations based on the reception strength of the WiFi radio waves, and acquires a current position based on the triangulation principle using the distances from the respective base stations and the positions of the respective base stations.

Further, for example, in the embodiments above, although the position metadata such as the map information or the POI information used for navigation is stored in an internal storage section, the present invention is not limited thereto. For example, the position metadata may be downloaded via a network in each case.

Note that in the present specification, the steps written in the flowchart may of course be processed in chronological order in accordance with the stated order, but may not necessarily be processed in the chronological order, and may be processed individually or in a parallel manner. It is needless to say that, in the case of the steps are processed in the chronological order, the order of the steps may be changed appropriately according to circumstances.

The present application contains subject matter related to that disclosed in Japanese Priority Patent Application JP 2010-000605 filed in the Japan Patent Office on Jan. 5, 2010, the entire content of which is hereby incorporated by reference.

What is claimed is:

1. A navigation device comprising:
a processor configured to:
acquire position information of a current position;
set a final destination;
set a genre of a facility to be stopped at before arriving at the final destination;
select a stop-off point from among facilities included in the genre set based on a route from the current position to the final destination;
search for the route from the current position to the final destination and a route from the current position to the stop-off point;
perform notification of the route to the stop-off point at a branch point between the route to the final destination and the route to the stop-off point while showing the route to the final destination;
when detecting that the position information of the current position enters the route to the stop-off point from the branch point, automatically switch a guidance destination to the stop-off point and show the route to the stop-off point; and
when detecting arrival at the stop-off point based on the position information, automatically switch the guidance destination to the final destination.

2. The navigation device according to claim 1, further comprising
a display configured to display a display screen in which the current position and a route to the guidance destination are superimposed on map information,
wherein the processor is further configured to cause the display section to display a screen in which an arrow indicating a direction that leads to the stop-off point is superimposed at the branch point between the route to the final destination and the route to the stop-off point on the display screen.

3. The navigation device according to claim 1, wherein when the processor detects the arrival at the stop-off point, the processor is further configured to select a stop-off point again from among facilities included in the genre set based on a route from a current position at a time point of the detection to the final destination.

4. The navigation device according to claim 1, wherein when processor detects that the route to the final destination is selected at the branch point, the processor is further configured to select a stop-off point again from among facilities included in the genre set based on a route from a current position at a time point of the detection to the final destination.

5. A navigation method, comprising:
causing a processor to execute predetermined procedures, the procedures including:
  setting a final destination;
  setting a genre of a facility to be stopped at before arriving at the final destination;
  searching for a route from a current position to the final destination;
  selecting a stop-off point from among facilities included in the genre based on the searched route to the final destination;
  searching for a route from a current position to the selected stop-off point;
  showing the route to the final destination;
  performing notification of a branch point between the route to the final destination and the route to the stop-off point;
  automatically switching a guidance destination to the stop-off point and showing the route to the stop-off point when detecting that a current position enters the route to the stop-off point from the branch point; and
  automatically switching the guidance destination to the final destination when detecting arrival at the stop-off point based on position information of a current position.

6. A non-transitory computer readable medium storing a program for causing a computer to function as:
  a position information acquisition section which acquires position information of a current position,
  a final destination setting section which sets a final destination,
  a stop-off genre setting section which sets a genre of a facility to be stopped at before arriving at the final destination,
  a stop-off point selection section which selects a stop-off point from among facilities included in the genre set by the stop-off genre setting section based on a route from the current position to the final destination,
  a route search section which searches for the route from the current position to the final destination and a route from the current position to the stop-off point, and
  a route guidance section which performs notification of the route to the stop-off point at a branch point between the route to the final destination and the route to the stop-off point while showing the route to the final destination, when detecting that the position information of the current position acquired by the position information acquisition section enters the route to the stop-off point from the branch point, automatically switches a guidance destination to the stop-off point and shows the route to the stop-off point, and when detecting arrival at the stop-off point based on the position information acquired by the position information acquisition section, automatically switches the guidance destination to the final destination.

7. The navigation device according to claim 1, wherein the route to the stop-off point is highlighted in a first manner and the route to the final destination is highlighted in a second manner different from the first manner.

8. The navigation method according to claim 5, the procedures further including:
  displaying a display screen in which the current position and a route to the guidance destination are superimposed on map information, and
  displaying a screen in which an arrow indicating a direction that leads to the stop-off point is superimposed at the branch point between the route to the final destination and the route to the stop-off point on the display screen.

9. The navigation method according to claim 5, the procedures further including:
  selecting a stop-off point again from among facilities included in the genre set based on a route from a current position at a time point of the detection to the final destination when detecting the arrival at the stop-off point.

10. The navigation method according to claim 5, the procedures further including:
  selecting a stop-off point again from among facilities included in the genre set based on a route from a current position at a time point of the detection to the final destination when detecting that the route to the final destination is selected at the branch point.

11. The navigation method according to claim 5, wherein the route to the stop-off point is highlighted in a first manner and the route to the final destination is highlighted in a second manner different from the first manner.

12. The non-transitory computer readable medium storing the program according to claim 6, further causing the computer to function as:
  a display section which displays a display screen in which the current position and a route to the guidance destination are superimposed on map information in accordance with a control of the route guidance section,
  wherein the route guidance section causes the display section to display a screen in which an arrow indicating a direction that leads to the stop-off point is superimposed at the branch point between the route to the final destination and the route to the stop-off point on the display screen.

13. The non-transitory computer readable medium storing the program according to claim 6, wherein when the route guidance section detects the arrival at the stop-off point, the stop-off point selection section selects a stop-off point again from among facilities included in the genre set by the stop-off genre setting section based on a route from a current position at a time point of the detection to the final destination.

14. The non-transitory computer readable medium storing the program according to claim 6, wherein when the route guidance section detects that the route to the final destination is selected at the branch point, the stop-off point selection section selects a stop-off point again from among facilities included in the genre set by the stop-off genre setting section based on a route from a current position at a time point of the detection to the final destination.

15. The non-transitory computer readable medium storing the program according to claim 6,
wherein the route to the stop-off point is highlighted in a first manner and the route to the final destination is highlighted in a second manner different from the first manner.

16. The navigation device according to claim 1,
wherein the navigation device is at least one of a mobile phone, a portable music reproduction device, a portable video processing device, a portable game device, and a portable imaging device.

17. The navigation method according to claim 5,
wherein processor is at least part of a mobile phone, a portable music reproduction device, a portable video processing device, a portable game device, and a portable imaging device.

18. The non-transitory computer readable medium storing the program according to claim 6, wherein the computer is at least one of a mobile phone, a portable music reproduction device, a portable video processing device, a portable game device, and a portable imaging device.

19. The navigation device according to claim 1,
wherein the genre includes a kind of facility.

20. The navigation device according to claim 19,
wherein the kind of facility includes at least one of a convenience store and a gas station.

\* \* \* \* \*